No. 878,499. PATENTED FEB. 11, 1908.
C. BROWNING, Jr.
DEVICE FOR THE INSPECTION OF CAR WHEELS.
APPLICATION FILED DEC. 18, 1906.
4 SHEETS—SHEET 1.
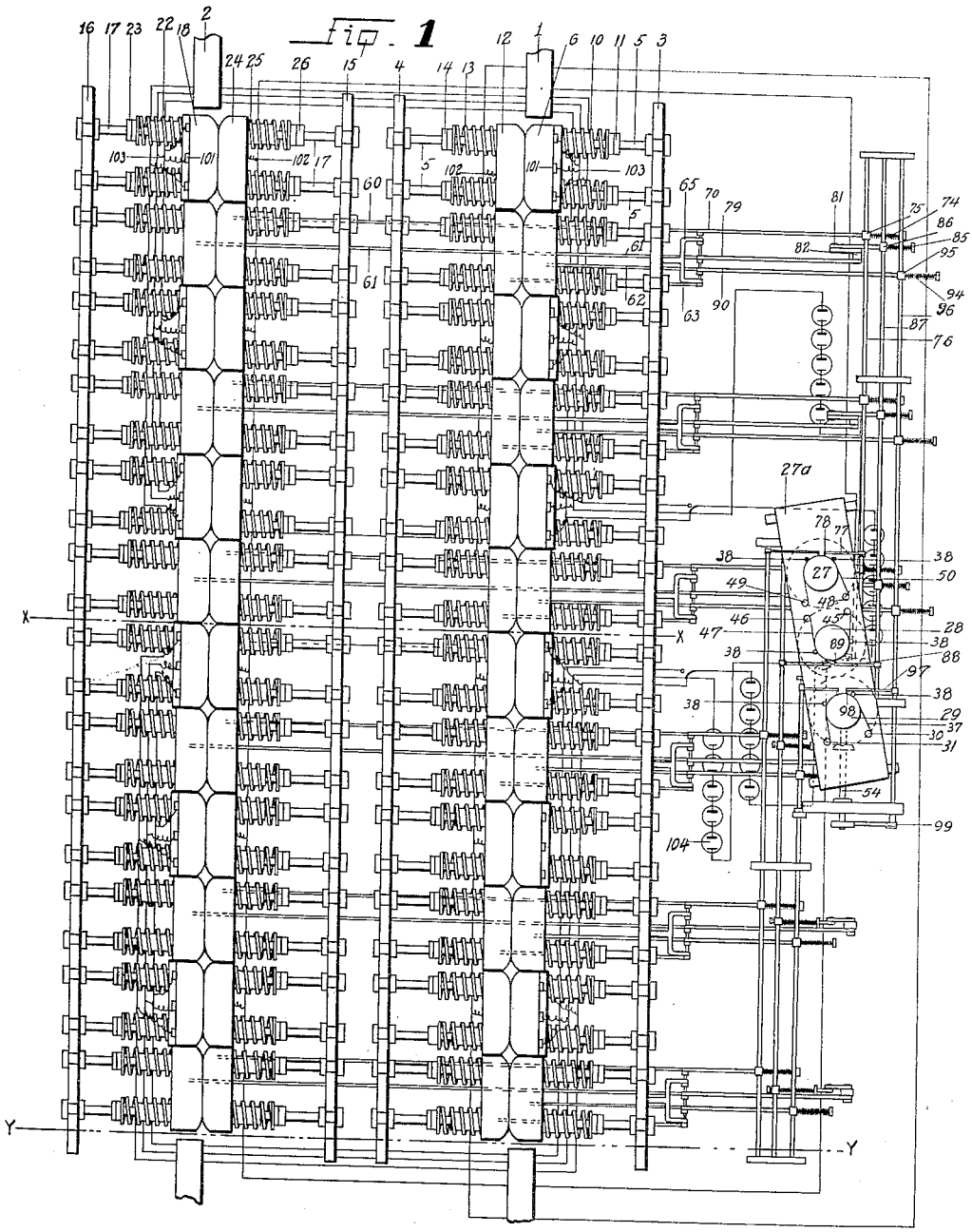
Witnesses
Frank H. Carter
J. B. Webster
Inventor
Charles Browning, Jr,
By Percy S. Webster
Attorney

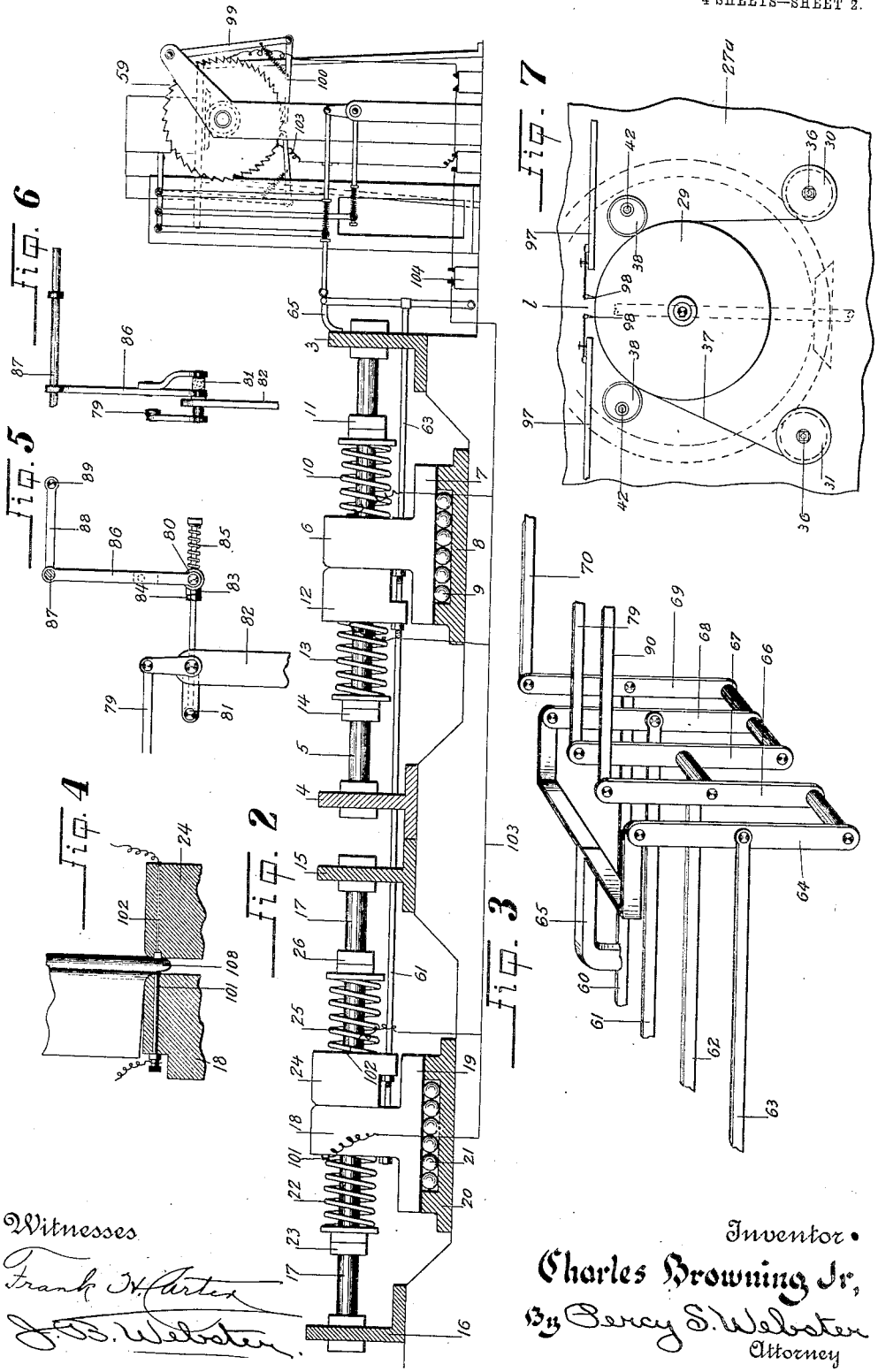

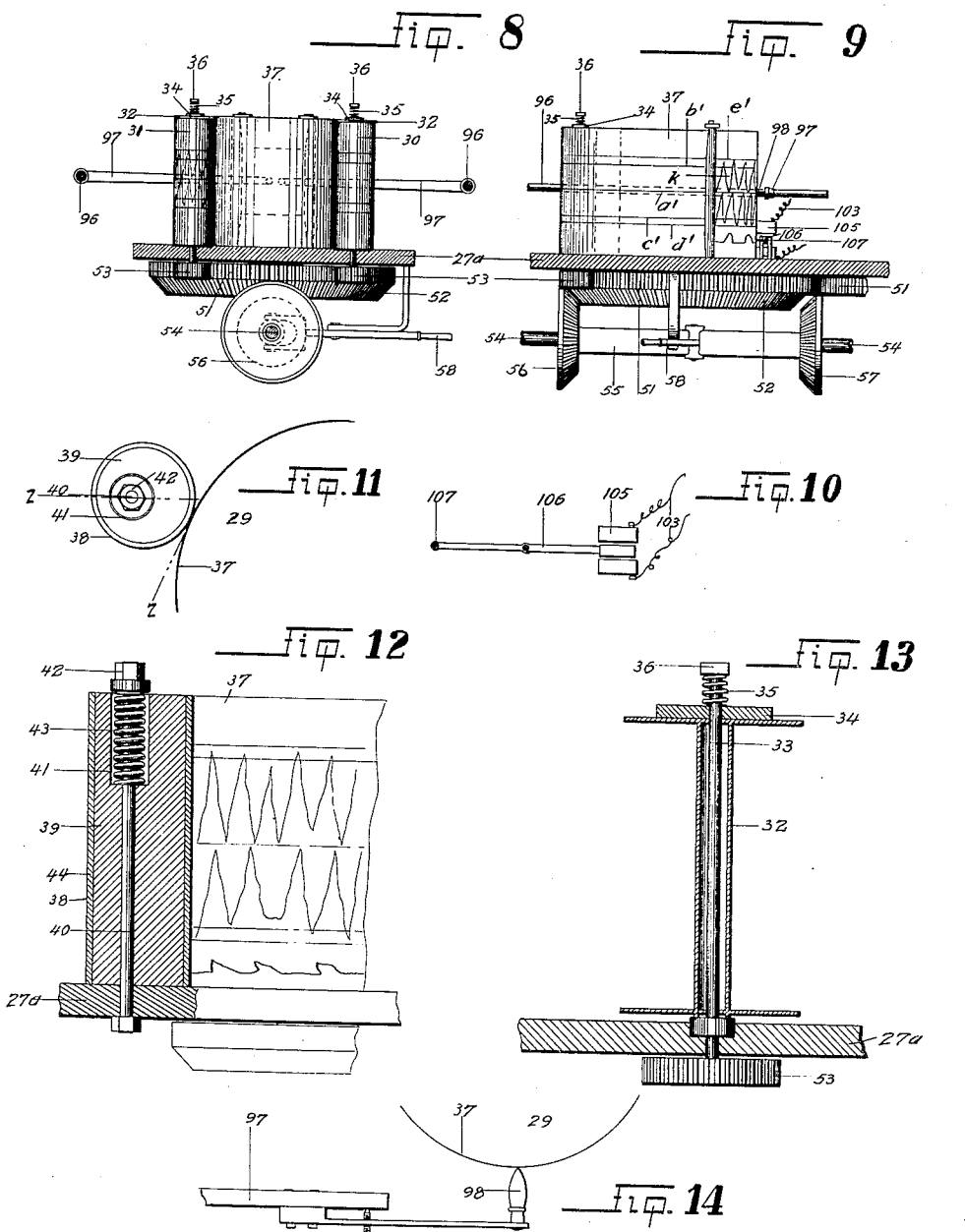

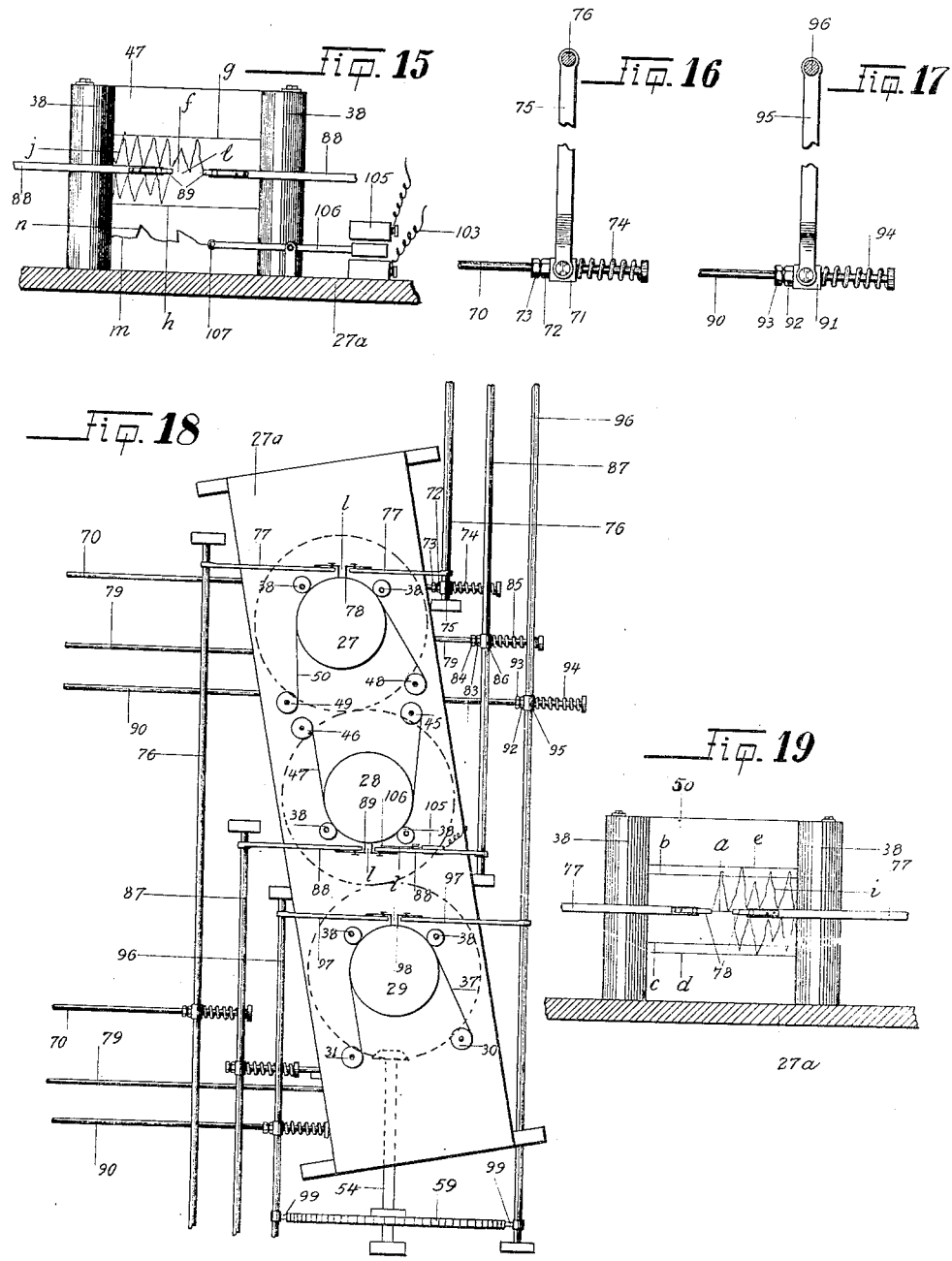

UNITED STATES PATENT OFFICE.

CHARLES BROWNING, JR., OF SACRAMENTO, CALIFORNIA.

DEVICE FOR THE INSPECTION OF CAR-WHEELS.

No. 878,499.

Specification of Letters Patent.

Patented Feb. 11, 1908.

Application filed December 18, 1906. Serial No. 348,473.

*To all whom it may concern:*

Be it known that I, CHARLES BROWNING, Jr., a citizen of the United States, residing at Sacramento, in the county of Sacramento and State of California, have invented certain new and useful Improvements in Devices for the Inspection of Car-Wheels; and I do declare the following to be a full, clear, and exact description of the same, such as will enable others skilled in the art to which it appertains to make and use the same, reference being had to the accompanying drawings, and the characters of reference marked thereon, which form a part of this specification.

This invention relates to improvements in the means or method of inspection of the flanges of car wheels and is particularly designed to detect those certain inherent or developed defects to be found in flanged wheels in use on power operated rail roads, the main object of the invention being to produce a more certain method for said inspection than is now possible, thus increasing the safety of the traveling public and also lessening the possibility of disastrous and expensive wrecks.

Further objects of the invention are as follows:—1. To furnish an accurate record of the conditions of the flanges of the car wheels under the cars, as they enter or leave a station, or in passing from one division to the next of the road, and to furnish this record by day or night in such a manner as to far surpass in certainty, rapidity and efficiency the usual method of inspection now in vogue. 2. To remove and overcome the difficulties of personal inspection as presented by the construction of modern cars. 3. To produce a device for the purpose which will record the conditions referred to compactly on paper and in such manner as to enable the same to be read and determined by a glance. 4. To produce a device which will enable the car inspectors to devote more time to the inspection of wheels and of cars for other defects not recorded by my improved device. 5. To produce a means for gaging the distance between two wheels on the same axle.

These objects I accomplish:—

First—By a means for gaging and recording the thickness of the flanges and distance between wheels at one or more points, consisting of a series of spring regulated blocks arranged end to end and adapted to conform to the width of or caliper the flanges, and having a lever mechanism connecting said blocks with a pencil recording mechanism in connection therewith.

Second—By a means for gaging and recording the vertical wear of the flanges at one or more points, consisting of a series of points adapted to contact with said flanges when a certain degree of wear is reached and an electrically operated recording mechanism in connection with said points adapted to record said vertical wear. By vertical wear is meant the wear vertically from the root of the flange outward to the point thereof.

Third—By such other and further construction as is necessary and sufficient to make a complete mechanism for the purposes set forth.

All of which will appear fully and specifically by a perusal of the following specification and claims.

In the drawing similar characters of reference indicate corresponding parts in the several views.

Figure 1 is a top plan view of the complete device. Fig. 2 is a view taken on a line $yy$ of Fig. 1. Fig. 3 is a perspective view of a lever mechanism. Fig. 4 is a fragmentary view of a flange calipering mechanism showing electric contact points arranged therein. Fig. 5 is a side elevation of a bell crank lever mechanism. Fig. 6 is an end view of Fig. 5. Fig. 7 is a top plan view of a paper drum recording mechanism. Fig. 8 is a rear elevation of Fig. 7. Fig. 9 is a side elevation of Fig. 7. Fig. 10 is a detached view of an electric pencil mechanism. Fig. 11 is a fragmentary view of a paper drum mechanism. Fig. 12 is a sectional view taken on a line $zz$ of Fig. 11. Fig. 13 is a sectional view of a paper rolling spool. Fig. 14 is a fragmentary view of a pencil adjusting mechanism. Fig. 15 is a front elevation of a paper recording mechanism. Figs. 16 and 17 are side elevations of swivel block and lever mechanisms. Fig. 18 is a top plan view of a series of paper drums with pencil marking mechanisms. Fig. 19 is a front elevation of a paper recording mechanism.

The defects which this device is designed to detect are as follows:—Flange missing wholly or in part. Flange worn to the limit of thickness in one or more places. Flange worn to limit of vertical wear in one or more places. Wheels out of gage at one or more points, due to wheel or wheels loose or shifted on axle, or originally pressed on out of gage, or due to bent or sprung axle or other causes. These defects I set forth at this point in order that the following specification and claims may be more easily understood.

The main subdivisions of this invention of mine are as follows:—1. The means for testing and recording the condition of the width of flange and the gage between wheels. 2. The means for testing and recording the wear vertically from the root of the flange outward to the point thereof.

In order to fully and clearly elucidate the invention, I will now set forth and describe each subdivision herein, it being here stated that M. C. B. standard gage or any other suitable gage may be the criterion used in the inspection of the wheels.

Describing the first subdivision:—1 designates one rail of the railroad and 2 the other rail thereof, the same being removed in the section wherein is constructed my improved device.

Arranged on each side of the line of the rail 1 within the section wherein I construct my device are T-irons 3 and 4. In said angle irons are secured a series of rods 5.

Movably mounted on every pair of rods 5 are blocks 6 disposed in alinement with and adapted to take the place of said rail 1 within the section wherein is constructed my device, and for that purpose are provided with base angles 7, (Fig. 2) fitted in channel irons 8 and resting on rollers 9 arranged in said channel irons for the purpose as will appear. The position of said blocks is regulated by means of springs 10 encircling said rods 5, the tension of said springs being regulated by means of nuts 11. Also mounted on said rods 5 are blocks 12 arranged end to end with the blocks 6, said blocks 6 and 12 being rounded at the corners for the purpose of receiving and guiding the flanges of the cars. The positions of said blocks 12 are regulated by means of springs 13 encircling said rods 5, the tension of said springs being regulated by means of nuts 14.

Arranged in connection with the rail 2 are parts 15—16—17—18—19—20—21—22—23—24—25 and 26 corresponding in all respects to the parts 3—4—5—6—7—8—9—10—11—12—13 and 14.

The above series of blocks and their parts are in the present representation of the device divided into two sections as at line $xx$, Fig. 1, each consisting of one or more sets of blocks, each section adapted to receive one half of the wheels, and thus test and record the flanges and gage between wheels at a plurality of points on the entire wheel as will appear. While I have just stated that each section may consist of one or more sets of blocks, the drawings and description as set forth in this specification elucidate the same as having three sets in each section and it will be understood that all the parts described are in conformity therewith.

The pencil marking mechanism which I will now describe will be elucidated as used in connection with one of said sections, it being understood that the same mechanism is used on each section. This pencil marking mechanism is constructed as follows:—

I provide a paper drum mechanism consisting of three main drums 27—28 and 29, resting on a platform $27^a$, (Figs. 1—8—9 and 18), the two end drums being adapted to receive the paper on which will be marked the condition of the flanges of the wheels on each side of the car respectively, and the middle one the paper on which will be marked the condition of the gage between wheels, all as will appear.

Arranged at the rear of the drum 29 are two paper rollers 30 and 31 constructed as follows:—A spool 32 (Fig. 13) is mounted over a spindle or shaft 33. A collar or washer 34 is then inserted over said spindle and rests on the top of said spool, a spiral spring 35 is then inserted over said spindle and a nut 36 mounted on the top of said spindle, said spring 34 bearing between said nut 36 and collar 34, all for the purpose as will appear. Secured on said roller 30 is paper 37 (Figs. 1—7—8—9—18) said paper extending around the drum 27 thence around the rollers 31, the same being advanced from one roller to another in a manner as will appear.

Bearing against the paper 37 on each side of the drum 29 is an eccentric roller 38 (Figs. 1—7—9—12—18) constructed as follows:—A roller 39 is mounted eccentrically on a spindle 40, said roller having an enlarged orifice 41 in the upper end, said spindle having a nut 42 mounted on the top thereof and a spring 43 encircling said spindle and bearing between the nut 42 and the bottom of the orifice 41. Encircling the roller 39 is a casing 44 which slips loosely around the roller 39. This construction holds the paper 37 tightly against the drum 29 by reason of the roller 39 being eccentrically mounted on the spindle 40, the amount of motion of said roller being regulated by means of the torsion of the spring 43 bearing against the sides of the orifice 41. The casing 44 prevents any binding of the paper for the reason that it runs free around the roller 39.

Arranged in connection with the drum 28 are rollers 45 and 46 constructed and operating the same as the rollers 30 and 31, the same carrying a paper 47 operating as does the paper 37. Guide rollers 38 also bear against said paper 47 as against the paper 37. Likewise rollers 48 and 49, similar to rollers 30 and 31, operate in connection with the drum 27, the same carrying paper 50, which is also provided with guide rollers 38.

Underneath the drums 27—28 and 29 and secured to the spindles thereof are pinion wheels 51, (Figs. 8—9) all intermeshing together, there being a bevel gear 52 secured to one of said gears 51 for the purpose as will appear. Secured to the spindles of the rollers 30—31—45—46—48 and 49 are small pinion wheels 53 intermeshing with the pinions 51.

54 is a shaft secured to the platform 27a. Mounted on said shaft is a sleeve 55 rotating with said shaft and carrying bevel gears 56 and 57 adapted to intermesh alternately with the gear 52, said sleeve being provided with a lever mechanism 58 adapted to throw gears 56 and 57 in or out of gear with the gear 52 as will appear.

On the end of the shaft 54 is a ratchet wheel 59, (Figs. 1—2—18) adapted to be in operative connection with automatic lever mechanisms hereinafter set forth.

Connecting the block mechanism described with the paper drum mechanism just set forth, are lever mechanisms constructed as follows:—A rod 60 (Figs. 1—3) is connected to every other block in the row of blocks 24 and extends through the irons 15—4 and 3. Similar rods 61—62 and 63 (Figs. 1—2—3) are secured to every alternate block in the rows of blocks 18—6 and 12 respectively. The rods 63 are pivotally secured to levers 64 mounted on hangers 65 (Figs. 1—3) secured to the iron 3. The rods 62 are pivotally secured to two levers 66 and 67, the levers 66 being pivotally secured at their lower end to the levers 64, and the levers 67 are pivotally secured at their lower ends to levers 68 which are mounted on the hangers 65, to which levers 68 are pivoted the rods 61. Rods 60 are pivotally secured to levers 69 which are pivoted at their lower ends to the levers 68. Operatively connecting said lever mechanism with said paper drum mechanism are pencil marking levers constructed and connected, as follows:—Rods 70 (Figs. 1—3) extend from the levers 69 through swivel blocks 71 (Fig. 16), there being nuts 72 and jam nuts 73 mounted on said rods and adapted to bear against said swivel blocks, on the inner side, there being springs 74 bearing between said swivel blocks and the ends of said rods 70, all for the purpose as will appear. Upward from the swivel blocks 71 are links 75 rigidly secured to pencil rods 76 (Figs. 1—18) having arms 77 carrying pencils, pens or hods 78, engaging with the paper 50 in a manner as will appear. Rods 79 extend from the levers 67 through swivel blocks 80 (Figs. 1—5—6), said rods being provided with bell cranks 81 pivoted to supports 82 and also with nuts 83 and jam nuts 84 adapted to bear against the swivel blocks 80, there being springs 85 bearing between the outer ends of said rods 79 and said blocks 80, for the purpose as will appear. Upward from the blocks 80 are links 86 rigidly connected to pencil rods 87 having arms 88 carrying pencils, pens or hods 89 engaging with the paper 47 in a manner as will appear. Rods 90 extend from the levers 66 through swivel blocks 91. Mounted on said rods 90 are nuts 92 and jam nuts 93 (Fig. 17) adapted to bear against the inner sides of the blocks 91, there being springs 94 bearing between the ends of said rods 90 and the outer sides of said swivel blocks 91, for the purpose hereinafter set forth. Upward from the swivel blocks 91 are links 95 rigidly secured to pencil rods 96 having arms 97 carrying pencils, pens or hods 98 engaging with the paper 37 in a manner as will appear. Secured to the outer end of the rod 96 (Figs. 1—2—18) is an arm 99 carrying a pawl finger 100 (Fig. 2) engaging with the ratchet wheel 59 for the purpose as will appear.

In practice the subdivision of the device just described operates as follows:—On the papers 50 and 37 are drawn lines $a$, $b$, $c$, $d$ and $e$ and $a'$—$b'$—$c'$—$d'$ and $e'$ respectively (Figs. 8—9—19), the line $a$ and $a'$ being the normal or center traveling lines of the pencils 78 and 98 respectively, and the lines $b$ and $c$ and $b'$ and $c'$ being so drawn as to indicate, in the operation now to be described, the minimum width of flange permitted, while the lines $d$ and $e$ and $d'$ and $e'$ indicate the maximum width permitted on each flange of each wheel of a truck. On the paper 47 are drawn lines $f$, $g$ and $h$, (Fig. 15), $f$ being the center line of travel of the pencil 89 while $g$ and $h$ indicate the minimum gage between wheels permitted. As the train passes on the device and the first set of wheels pass into the first set of blocks the following occurs:—The blocks being forced apart by the flange of the wheels, said blocks close in tight on or caliper said flanges and in so doing operate the pencils 78—89 and 98 in the following manner:—As the block 24 moves outward; in calipering the flange of the wheel it pushes on the lever 60 which forces the lever 69 outward, while the block 18 being forced outward pulls on the rod 61 which pulls on the lever 68, which action forces the lever 69 outward still farther, the complete motion of said lever 69 being transmitted by the lever 70 to the swivel block 71, the bearing nut 72 forcing said swivel block outward, this action by means of the link 75 rotating the pencil rod 76 which causes the pencil 78 to make a mark $i$ upward on the paper 50, (Fig. 19) thus showing the condition of the flange of the wheel at that point between the blocks 24 and 18. If the mark $i$ falls below the line $b$ it indicates the flange to be so worn as to cause the wheel to be condemned.

Simultaneously with the above operation, as the rod 61 pulls the lever 68 inward, it incidentally throws the lever 67 outward, and as the block 6 is forced outward it throws this lever 67, by means of rod 62, outward still farther, the complete motion of said lever 67 causing the rod 79 to drive the swivel block 80 outward by means of the bearing nut 83, this action causing the link 86 to rotate the pencil rod 87, thus causing the pencil 89 to make a mark $j$ on the paper 47, thus showing the gage between wheels. At this point it might be well to state that although the above description describes the blocks 18 and 6 as moving only outward, still in practice they might move inward by reason of the wheels being out of gage inward, that is the distance between them might be too narrow. In this event the lever 67 would be pulled inward and to cover this contingency I provide the bell cranks 81 thereby causing the pencil levers 87 to be rotated in but one direction no matter in which direction the lever 67 operates. Referring again to the operation, if the line $j$ falls below the line $g$ then the gage between wheels is such as to render them subject to condemnation.

As the block 6, through the lever 62, throws the lever 67 outward it also throws the lever 68 outward and as the block 12 is forced outward it pulls the lever 64, by means of rod 63, inward thus throwing the lever 66 farther outward, the complete motion of the said lever 66 causing the rod 90 to push the swivel block 91 out by means of bearing nut 92, this causing the link 95 to rotate the rod 96, thus causing the pencil 98 to make a mark $k$ on the paper 37. If said mark $k$ falls below the line $b'$ on the paper 37 then the flange of the wheel between the blocks 12 and 6 is so worn as to cause the wheel to be condemned. As the pencil rod 96 rotates it causes the pawl finger 100 to rotate the ratchet wheel 59 which incidentally rotates the shaft 54, which causes the gears 56—52—51 and 53 to rotate the paper drums and rollers, thus advancing the papers 37—47 and 50, ready to receive the next marking. This movement of the papers 37—47 and 50 is described by friction alone, this friction being caused by the nuts 36 and springs 35, the spools 32 running free save and except for the friction caused by said nuts and springs bearing on said collars 34. The object of this is to not move the paper too rapidly but to simply keep it taut against the drums 27—28 and 29. The said papers or record strips are thus advanced one step by each actuation of every alternate set of blocks to which the levers or links 62 are attached and said number of sets of blocks may be increased or diminished according to the number of points on the wheel at which it is desired to test the width of flange or the gage between wheels on the same axle.

The section of the device as indicated below the line $xx$ (Fig. 1) operates exactly similar in all respects as does that above said line with the exception that the pencils mark downward markings on the said papers, the distance between the pencils on each drum being of such a length that when the markings of the condition of flanges and gage between wheels for one half the wheel has been marked by the section above the line $xx$ the first mark for the workings of the section below said line will begin just below the first of the marking on the section above, thus dividing the markings into divisions of each set of wheels constituting a truck.

The gear wheels 56 and 57 are manually thrown alternately in and out of gear with the gear 52 as the train passes onto the device from one direction or the other.

The purpose of the swivel blocks 71, 80 and 91, nuts 72, 83 and 92, and springs 74, 85 and 94 is to permit the conditions of the flanges and the gage between wheels at one or more points to be recorded by one pencil lever, which purpose is accomplished as follows:— When one of said links 75, 86 or 95 is being forced outward, thus rotating its corresponding pencil rod, the remaining links being rigidly secured to said rod, compress the remaining springs, and when the action of said pencil rod is complete said springs force the respective links back against their respective bearing nuts, thus doing away with the necessity of having a separate pencil rod for each and every distinct link.

Describing the second subdivision of the device:—On the blocks 6 and 18 intermediate those carrying the pencil lever mechanism described are electric contact points 101, while the corresponding blocks 12 and 24 are provided with opposite pole connections 102, said connections 101 and 102 being connected by wires 103 to batteries 104, thence to solenoids 105 between which is pivoted a pencil rod 106 carrying a pencil 107 engaging with the paper 37, (Figs. 9 and 10) or either of the other papers. The points 101 are so arranged that when the flange 108 of the wheel is worn to the limit of vertical wear as described, said points contact therewith, and the points 102 complete the circuit to the solenoids 105 thereby magnetizing them and thus causing the pencil rod 106 to be attracted, thus causing the pencil 107 to leave its normal line $m$ (Fig. 15) and make a jog $n$ thus showing the flange to be worn to limit of vertical wear and thus subject to condemnation. This solenoid pencil mechanism registers jog $n$ as described in case flange is worn to limit on either or both wheels of any pair of wheels passing through the device.

Thus it will be seen I have produced a device by means of which the thickness of the flange of a car wheel may be tested and recorded at any desired number of points; one by means of which the gage of the wheels may be tested and recorded at any number of points; and one by means of which the vertical wear of the flanges may be tested and recorded at any number of points. All the above being done automatically without need of personal inspection, all that it is necessary for the inspector to do being to read the records on the paper drums as described.

While I have in this specification set forth in detail the present and preferred construction of my improved device, still in practice many changes and modifications may be resorted to at will, none of which will, however, form a departure from the spirit of the invention.

Having thus described my invention, what I claim as new and useful, and desire to secure by Letters Patent is:—

1. In a device of the character described a railway, and means disposed at intermediate points therein for automatically calipering the flanges of the wheels riding over said railway, as set forth.

2. In a device of the character described, a railway, means at intermediate points therein for testing the conditions of the flanges of car wheels passing over said railway, and means for recording the movements of such testing means, as described.

3. In a device of the character described a railway, and means formed as a part of said railway whereby the conditions of the flanges of wheels passing over said railway will be tested, as described.

4. In a device of the character described a means for testing the vertical wear of wheel flanges, a recording means, and electrical connections between said testing means and such recording means, as set forth.

5. In a device of the character described a plurality of blocks arranged end to end, means permitting said blocks to caliper car wheel flanges, and means connected with said blocks for recording the thickness of said flanges, as described.

6. In a device of the character described a plurality of blocks arranged end to end, means permitting said blocks to caliper car wheel flanges, and means in connection with said blocks for recording certain limits of vertical wear on said flanges, as set forth.

7. A railway, and means at intermediate points therein for testing and recording the gage between the car wheels passing over said railway, as set forth.

8. In a device of the character described a plurality of blocks arranged end to end, means permitting said blocks to caliper car wheel flanges, and means in connection with said blocks for recording the gage between said flanges, as set forth.

9. In a device of the kind described a system of blocks arranged end to end, a system of lever operated pencils, rods connecting said blocks to said pencils; and means for receiving records from said pencils, as set forth.

10. In a device of the character described a plurality of blocks arranged end to end, means permitting said blocks to caliper car wheel flanges, and pencil recorders in electrical connection with said blocks, as specified.

11. In a device of the character described a plurality of blocks arranged end to end, means permitting said blocks to caliper car wheel flanges, lever pencil mechanisms in connection with said blocks and a paper drum mechanism in connection with said pencils, as set forth.

12. In a device of the character set forth a plurality of blocks arranged end to end, means permitting said blocks to caliper car wheel flanges, and pencil marking means connected with said blocks, as set forth.

13. The combination with a means for calipering the flanges of car wheels of a system of levers consisting of pivoted and floating levers so arranged as to coact with the movements of said calipering means, and means in connection with said levers for recording their movements, as set forth.

14. In a device of the kind described a means for forming an electrical contact with car wheel flanges where a limit of vertical wear is reached, and means for recording said contact, as specified.

15. In a device of the kind described a means for making electrical contact with car wheel flanges when a limit of vertical wear is reached, and a pencil marking mechanism in connection therewith consisting of two solenoids and a pencil carrying lever pivotally mounted between said solenoids and engaging with a paper drum, as specified.

16. In a device of the kind described the combination with a lever testing and marking device of a paper drum mechanism for receiving said markings consisting of a large main drum, two auxiliary drums at each side on said large drum, and automatic means for rotating said drums, as specified.

17. In a device of the kind described a means for calipering car wheel flanges, a lever mechanism connected therewith, a pencil lever mechanism connected with said lever mechanism and a paper drum mechanism arranged in connection with said pencil lever mechanism and consisting of a series of drums, a paper roller disposed to the rear of each of said drums on each side thereof, frictional operating means for rotating said rollers, eccentric rollers bearing on each side of said drums, and pencils on said pencil levers and engaging with said drums, as set forth.

18. In a device of the character described a series of blocks arranged end to end and adapted to caliper the flanges of car wheels, levers secured to each of said blocks and connected to a system of upright levers, levers extending from said upright levers through swivel blocks, nuts mounted on said last named levers on the inner side of said swivel blocks, springs mounted on said last named levers on the outer sides of said swivel blocks, pencil levers rigidly secured to said links, pencils carried by said levers, and paper drum mechanisms adapted to co-act with said pencils, as set forth.

19. In a device of the character described a railway and means at intermediate points therein for calipering the flanges of the car wheels passing thereover, and means for recording the movement of such calipering means.

20. In a device of the character described a plurality of blocks arranged end to end, means permitting horizontal movement of said blocks and means for recording such movement, as described.

21. In a device of the character described a plurality of blocks arranged end to end, means permitting said blocks to move outward from each other, and means for recording such motion as set forth.

22. In a device of the character described a railway, means at intermediate points in said railway for calipering the flanges of car wheels passing over said railway, and means recording the motion of such calipering means, as described.

23. In a device of the character described a railway, and means formed as a part thereof whereby certain limits of vertical wear of the flanges of the wheels passing thereover will be detected, as described.

24. In a device of the character described a railway, means formed therein for detecting certain limits of vertical wear in the flanges of wheels passing over such railway, and electrically operated means for recording such limits of vertical wear, as set forth.

25. In a device of the character described a railway, means formed therein for testing car wheels passing thereover, pencil levers, means connecting testing means and said pencil levers, and pencils carried by such pencil levers, and a paper drum mechanism in operative connection with said pencils, as set forth.

26. In a device of the character described a plurality of blocks arranged end to end and adapted to caliper car wheel flanges, a plurality of pencil levers, pencils carried thereby, means for receiving the markings of said pencils, and means whereby the movement of a plurality of said blocks may be recorded by one of said pencils, as set forth.

27. In a device of the character described a plurality of blocks arranged end to end and being capable of horizontal movement, a plurality of pencil carrying rods, levers connecting said blocks to said rods, and means whereby the motion of a plurality of such blocks may be intermittently transmitted to said rods by said levers, as set forth.

28. The combination with one or more means for calipering the flanges of car wheels of a system of levers in connection therewith, said levers being in connection with pencil rods, and means in connection with said levers whereby the motion of one or more of said calipering means may be recorded by a pencil carried by the same pencil rod, as set forth.

29. The combination with a means for calipering the flanges of car wheels of a system of levers so arranged as to co-act with said calipering means, swivel blocks, said levers operating in said swivel blocks and extending therebeyond, links leading from said swivel blocks to pencil carrying rods, nuts mounted on said levers on the inner sides of said swivel blocks, and springs bearing between the outer ends of said levers and said swivel blocks, as and for the purpose set forth.

30. The combination with a means for calipering the flanges of car wheels of a system of levers so constructed as to co-act with the motion of said calipering means, swivel blocks, said levers operating in said swivel blocks, links leading from said swivel blocks to pencil rods, nuts mounted on said levers, and springs bearing between said nuts and said swivel blocks, as set forth.

31. In a device of the character described, a railway, and means disposed at intermediate points therein for automatically testing the conditions of the flanges of the wheels riding over said railway, as described.

In testimony whereof I affix my signature in presence of two witnesses.

CHARLES BROWNING, JR.

Witnesses:
PERCY S. WEBSTER,
JOSHUA B. WEBSTER.